3,064,050
PROCESS FOR THE PREPARATION OF METHYLOLACRYLAMIDE
Kenneth W. Saunders, Darien, Conn., and Louis L. Lento, Jr., North Scituate, Mass., assignors to American Cyanamid Company, New York, N.Y., a corporation of Maine
No Drawing. Filed Jan. 3, 1961, Ser. No. 80,012
4 Claims. (Cl. 260—561)

This invention relates to the preparation of N-alkylol unsaturated amide monomers. More particularly it relates to an improved process for preparing methylolacrylamide.

Heretofore numerous proposals have been advanced for the preparation of N-alkylol unsaturated amides from the corresponding unsaturated amide and an aldehyde. In each of the proposed methods marked disadvantages have been found. More often than not, such disadvantages have seriously hampered widespread commercial exploitation of these processes for preparing N-alkylol unsaturated amides. Thus, in one method, an aqueous solution of acrylamide has been reacted with an aqueous solution, usually 37%, of formaldehyde, so as to yield methylolacrylamide in dilute aqueous solution. The principal disadvantage of such procedure is that methylolacrylamide cannot be isolated directly. Thus, evaporative or azeotropic techniques are required to concentrate the solution in order to obtain methylolacrylamide in an easily recoverable form which is desired. Furthermore, if an azeotropic technique is employed toxic or flammable solvents are required in order to recover methylolacrylamide. Moreover, the yields and purity of methylolacrylamide are not satisfactory.

Additionally, acrylamide has been reacted with paraformaldehyde in both concentrated alcoholic solutions and in the presence of halogenated solvents. While either of these methods constitutes an improvement over the dilute aqueous method, nonetheless the use of toxic or flammable solvents in the reaction constitutes a very distinct hazard for semi-commercial or commercial processes. In addition to the potential hazards brought about by the use of such solvents, special equipment and precautions are required in clarification and filtration operations. Furthermore, the use of such organic solvents on a production scale requires a solvent recovery system in order to bring about an economical process. Moreover, additional processing is generally required in order to obtain a product which is substantially free of contaminants and impurities.

Another method which has been employed for the preparation of methylolacrylamide has been the fusion process wherein solid acrylamide has been reacted with solid paraformaldehyde. See, for example, U.S.P. No. 2,864,861. Even employing this process, however, numerous difficulties are found. One hazard is the problem of scale-up wherein it is exceedingly difficult to dissipate the heat of reaction. In addition, the process is a multiple step one in that the solid methylolacrylamide most frequently has to be recrystallized in order to achieve a fairly uniform and pure product. In this process, violent polymerization of acrylamide upon fusion occurs. Moreover, the yields are low and the use of toxic or flammable solvents again presents a problem.

It will thus be seen that while numerous expedients have been tried, no one particular method offers a simple or easy route to the preparation of methylolacrylamide. In view of the increased importance of methylolacrylamide in recent years, an attractive commercial process for its preparation is highly desirable. Since the polymerization and copolymerization products of methylolacrylamide have wide applicability in such fields as adhesives, fibers, surface coatings, paper, textiles and the like, the need for an economically feasible process without any of the attendant disadvantages and hazards found in prior art methods is very desirable.

A principal object of the present invention is an improved process for the preparation of methylolacrylamide whereby the disadvantages of prior art methods are avoided. A further object of the present invention is to prepare solid, well defined crystalline monomeric methylolacrylamide useful in the preparation of polymers. Another object of the present invention is to provide a method for the preparation of methylolacrylamide from readily accessible starting materials wherein multiple costly processing steps are avoided. A still further object of the present invention is to prepare substantially pure methylolacrylamide from acrylamide and an aldehyde in high yields. A still further object of the present invention is to provide a process for preparing methylolacrylamide using carefully controlled conditions for their preparation in an all water system. It has now been discovered that acrylamide may be reacted with formaldehyde in an aqueous system in which the amount of acrylamide constitutes at least 60% and not more than 97% by weight of the amide and water present in the system. Unexpectedly, the ultimate yield of methylolacrylamide obtainable by such a process is extremely higher than that which might have been expected for an aqueous system in view of the fact that the reactant, i.e. acrylamide, and the product, i.e. methylolacrylamide, are both extremely soluble in water. Moreover, the process affords a product which is virtually free of contaminating impurities. A further advantage of the process of the present invention is that it can be carried out at a temperature where polymerization is negligible even in the absence of an inhibitor.

It is essential that the process be carried out in an aqueous medium wherein the amount of reactant, i.e. acrylamide, is at least 60% and not more than 97% by weight of the amount by weight of amide and water present in system and preferably in an amount from about 75% to about 90% by weight. If concentrations lower than 60% are employed, difficulty in recovering methylolacrylamide will be encountered and multiple steps must be employed in order to achieve fair yields by either azeotropic recovery methods or evaporative techniques. Similarly, if concentrations of acrylamide greater than 97% are employed, spontaneous polymerization of the starting material may result because of the substantially higher temperature required.

A further requirement of our novel process is the use of a basic catalyst to provide a pH of from about 8 to about 11. Preferably, the pH of the reaction mixture is 9 to 10. Among such catalysts which may be employed there may be mentioned triethylamine, tri-n-propylamine, tri-n-butylamine, potassium carbonate, sodium carbonate, potassium hydroxide, sodium hydroxide, barium hydroxide, sodium and potassium alkoxides e.g., sodium ethoxide, potassium propoxide, etc. Sodium hydroxide, however, is preferable. In addition to a catalytic amount of alkaline material being present in the reaction system it is generally desirable to neutralize any acidic material, most probably acrylic acid, which may be present in the starting unsaturated amide. The amount of base employed will generally be molecularly equivalent to the amount of acid present. Neutralization of the acidic material enables the reaction to proceed more smoothly after the addition of catalyst. While formaldehyde per se may be used usually a source thereof such as paraformaldehyde, trioxane or the like is employed. Of these, paraformaldehyde is preferred. Equimolecular amounts of the reactants i.e. acrylamide and formaldehyde, are generally employed. However, a slight excess of either reactant apparently does not affect the reaction.

The reaction may be conducted over a fairly wide temperature range. In general, temperatures ranging from about 20° C. to about 90° C., have been employed. It is preferable, however, to employ temperatures from about 25 to about 50° C., in order that the product may be recovered fairly easily without expensive refrigeration. In view of the exothermic nature of the reaction, it may be desirable to cool the reaction mixture in order that possible polymerization of either reactants or the products may be forestalled. The time of reaction will vary depending upon the amount of the reactants employed, catalyst, temperature and the like. In general, reaction times of from about one-half hour to about twenty-four hours are satisfactory.

A polymerization inhibitor such as sodium nitrite or cupferron may be incorporated in the system to prevent polymerization. Generally, however, the use of such an inhibitor is not required when the reaction temperatures are below about 40° C.

The methylolacrylamide product is easily separated from the product solution by crystallization. Cooling of the solution to about 20° C. or lower to effect such separation of crystalline product is preferred. The product is filtered from the reaction mixture and air-dried. By subsequent recycling of mother liquors recovered from separation of product methylolacrylamide, the ultimate yield of product can be increased to almost 100% from "once through" yield of from about 60 to 80%.

In order to illustrate the method of conducting the present invention the following examples are given.

*Example 1*

To a suitable reaction vessel containing 845 grams of water to which is added 0.85 gram of cupferron is charged 4370 grams of 96% acrylamide (59.4 moles) and the mixture is stirred at 45 to 50° C., until the acrylamide has dissolved. 120 cc. of triethylamine are added to raise the pH to 9.6. The temperature is maintained at 50° C., while charging 1890 grams of 96.6% paraformaldehyde (60.8 moles formaldehyde). The reaction is continued for a period of about two hours until the concentration of free-formaldehyde indicates that the reaction is substantially complete. The solution is cooled to 15° C., and solid crystals of methylolacrylamide (29.3 moles) are removed from the solution with suction. The solid methylolacrylamide collected together with the methylolacrylamide in the filtrate (recycle liquor) represented an almost quantitative yield.

*Example 2*

The procedure of the Example 1 is repeated in all material respects except that the acrylamide is neutralized prior to reaction to its equivalence point, pH 9.8, with 50% sodium hydroxide solution followed by the addition of 50 cc. of triethylamine. After about one hour reaction time followed by the cooling of the solution to about 15° C., 28.0 moles of methylolacrylamide, M.P. 75–8° C., are recovered. The "once through" yield of methylolacrylamide is thus 47% and the ultimate yield is nearly quantitative. The melting point of methylolacrylamide recrystallized five times from alcohol is 76.5–77.7° C., thus indicating that a product of a high degree of purity is obtained.

*Example 3*

The procedure of Example 1 is repeated except that following the addition of 96% acrylamide the solution is adjusted to pH of 8.0 with 50% NaOH solution and triethylamine. Subsequently, paraformaldehyde is added with stirring while the temperature of the reaction is maintained at 50° C. as in Example 1. Reaction is conducted for a period of about one-half hour and solid crystalline acrylamide, M.P. 77–79° C., is recovered upon cooling of the reaction mixture to 8° C. The "once through" yield is 53% and the ultimate yield is greater than 90%.

*Example 4*

To a suitable reaction vessel is charged 423 grams of water and 2200 grams of 96% acrylamide to which is added 0.43 gram of cupferron. The acrylamide slurry is heated to about 50° C. at which time 21 cc. of 50% NaOH solution is added both as a neutralizing agent and as a catalyst. The pH of acrylamide solution after addition of NaOH was 9.8. The temperature is maintained at 50° C. and then paraformaldehyde (96.6%) amounting to 940 grams is added with stirring. Reaction time is one-half hour. Subsequently, the reaction mixture is cooled to 10–15° C. and is filtered. The once through yield is 45% and the ultimate yield exceeds 90%.

*Example 5*

To a suitable reaction vessel is charged 13 lbs. of water and 67 lbs. of 96% acrylamide. The pH of the slurry is then adjusted to 9.8 with 50% NaOH solution. While maintaining the temperature of the acrylamide slurry at 30–40° C., 29.3 lbs. of 96.6% paraformaldehyde are added with stirring. The reaction is allowed to continue at 30–40° C., for a period of two hours. The reaction mixture is then cooled to 16° C. and filtered to recover 45.2 lbs. of methylolacrylamide, M.P. 75–77.5° C., a once through yield of 49%. Recycling of the mother liquor affords an additional amount of product which when added to the amount previously recovered indicates a substantially quantitative overall yield.

*Example 6*

To a suitable reaction vessel is charged 189 lbs. of water which is heated to 50° C. Cupferron, 0.1 lb. is then added. Subsequently, 995 lbs. of 95% acrylamide are added with stirring while maintaining the temperature at 45 to 50° C. The pH is adjusted to about 9.5 with 50% NaOH solution. The solution is then cooled to 30° C. with stirring over a two hour period. While maintaining the temperature at 25 to 30° C. and pH at 9.5, 420 lbs. of paraformaldehyde are added. The reaction mixture is stirred at 30° C. until the reaction is substantially complete as indicated by the free formaldehyde content being less than 2%. The solution containing the product is clarified and cooled to about 23° C. Methylolacrylamide crystals are added to the clarified liquor to induce precipitation. The crystalline material which readily precipitates is separated by centrifuge and is subsequently dried. Subsequent recycling of mother liquor affords an ultimate yield of 1340 lbs. of methylolacrylamide amounting to 98% based upon acrylamide.

We claim:
1. A process for preparing methylolacrylamide which comprises bringing into reactive contact in an aqueous medium at a pH of from about 8 to about 11 equimolecular quantities of acrylamide and formaldehyde at a temperature between about 20° C., and about 90° C., said acrylamide being present in an amount from about 60 to about 97% by weight of said acrylamide and water of said aqueous medium, and recovering methylolacrylamide.

2. A process as in claim 1 in which said acrylamide is present in an amount from about 75% to about 90% by weight of said acrylamide and water of said aqueous medium.

3. A process as in claim 1 in which the reaction is conducted at a pH of from about 9 to about 10.

4. A process as in claim 2 in which formaldehyde is present as paraformaldehyde.

References Cited in the file of this patent

UNITED STATES PATENTS

| | | |
|---|---|---|
| 2,760,977 | Fever et al. | Aug. 28, 1956 |
| 2,864,861 | Wohnsiedler et al. | Dec. 16, 1958 |
| 2,864,862 | Sutherland et al. | Dec. 16, 1958 |